(12) United States Patent
Sibbach

(10) Patent No.: US 10,489,896 B2
(45) Date of Patent: Nov. 26, 2019

(54) HIGH DYNAMIC RANGE VIDEO CAPTURE USING VARIABLE LIGHTING

(71) Applicant: General Electric Company, Schenectady, NY (US)

(72) Inventor: Arthur William Sibbach, Boxford, MA (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 15/812,017

(22) Filed: Nov. 14, 2017

(65) Prior Publication Data
US 2019/0147571 A1 May 16, 2019

(51) Int. Cl.
| | |
|---|---|
| G06T 5/00 | (2006.01) |
| G06T 5/50 | (2006.01) |
| G06T 7/00 | (2017.01) |
| F01D 21/00 | (2006.01) |
| H04N 5/235 | (2006.01) |

(52) U.S. Cl.
CPC ............ *G06T 5/009* (2013.01); *F01D 21/003* (2013.01); *G06T 5/50* (2013.01); *G06T 7/001* (2013.01); *H04N 5/2355* (2013.01); *G06T 2207/10016* (2013.01); *G06T 2207/10068* (2013.01); *G06T 2207/20208* (2013.01); *G06T 2207/20221* (2013.01); *G06T 2207/30164* (2013.01)

(58) Field of Classification Search
CPC . G06T 5/009; G06T 5/50; G06T 7/001; F01D 21/003
See application file for complete search history.

(56) References Cited

U.S. PATENT DOCUMENTS

| | | | |
|---|---|---|---|
| 3,694,094 A | 9/1972 | Mitchell | |
| 3,936,217 A * | 2/1976 | Travaglini | ............ F01D 21/003 |
| | | | 415/118 |
| 4,699,463 A | 10/1987 | D'Amelio et al. | |
| 5,253,638 A | 10/1993 | Tamburrino et al. | |
| 5,345,339 A | 9/1994 | Knieriem et al. | |
| 5,549,542 A | 8/1996 | Kovalcheck | |

(Continued)

OTHER PUBLICATIONS

U.S. Appl. No. 15/671,502, filed Aug. 8, 2017.
U.S. Appl. No. 15/278,541, filed Sep. 28, 2016.

*Primary Examiner* — David F Dunphy
(74) *Attorney, Agent, or Firm* — Dority & Manning, P.A.

(57) ABSTRACT

A system and method is generally provided for producing a high dynamic range video. The system includes a probe and a computer communicatively coupled to the probe. The probe includes a camera and a light source. Further, the probe produces a plurality of frames. The computer includes at least one processor and at least one memory device. The memory device contains instructions configured to combine the plurality of frames into composite frames. The instructions are further configured to filter out portions of frames captured below a first threshold of light and portions of frames captured above a second threshold of light. The light source modulates a lighting characteristic, and the camera captures a first video with the modulated light source to produce a plurality of frames defining a plurality of lighting characteristics. Further, the computer combines the plurality of frames into a second video including a plurality of composite frames.

18 Claims, 6 Drawing Sheets

(56) References Cited

U.S. PATENT DOCUMENTS

| | | | |
|---|---|---|---|
| 5,774,212 A * | 6/1998 | Corby, Jr. | G01N 21/95684 |
| | | | 356/237.2 |
| 5,850,469 A | 12/1998 | Martin et al. | |
| 6,124,974 A | 9/2000 | Burger | |
| 6,134,003 A | 10/2000 | Tearney et al. | |
| 6,483,535 B1 | 11/2002 | Tamburrino et al. | |
| 6,560,013 B1 | 5/2003 | Ramsbottom | |
| 6,753,876 B2 * | 6/2004 | Brooksby | G01B 11/25 |
| | | | 345/440 |
| 6,793,399 B1 | 9/2004 | Nguyen | |
| 7,064,811 B2 | 6/2006 | Twerdochlib | |
| 7,171,279 B2 | 1/2007 | Buckingham et al. | |
| 7,901,348 B2 | 3/2011 | Soper et al. | |
| 7,914,446 B2 | 3/2011 | Keller | |
| 8,139,103 B2 | 3/2012 | McGrew | |
| 8,311,738 B2 | 11/2012 | Politick et al. | |
| 8,485,038 B2 | 7/2013 | Sengupta et al. | |
| 8,602,722 B2 | 12/2013 | George et al. | |
| 8,950,004 B2 | 2/2015 | Messinger et al. | |
| 9,002,112 B2 | 4/2015 | France | |
| 9,026,247 B2 | 5/2015 | White et al. | |
| 9,036,892 B2 | 5/2015 | Domke et al. | |
| 9,149,929 B2 | 10/2015 | Motzer et al. | |
| 9,218,470 B2 | 12/2015 | Domke et al. | |
| 9,458,735 B1 | 10/2016 | Diwinsky et al. | |
| 9,476,823 B2 | 10/2016 | Ward et al. | |
| 9,551,620 B2 | 1/2017 | Singh et al. | |
| 9,641,125 B2 | 5/2017 | Johnston | |
| 9,710,573 B2 | 7/2017 | Messinger et al. | |
| 9,715,100 B2 | 7/2017 | Konomura et al. | |
| 10,200,623 B1 * | 2/2019 | Baldwin | H04N 5/2258 |
| 2005/0199832 A1 | 9/2005 | Twerdochlib | |
| 2006/0025668 A1 | 2/2006 | Peterson et al. | |
| 2006/0247511 A1 | 11/2006 | Anderson | |
| 2008/0186018 A1 | 8/2008 | Anderson | |
| 2008/0238413 A1 | 10/2008 | Anderson | |
| 2009/0079426 A1 | 3/2009 | Anderson | |
| 2009/0096443 A1 | 4/2009 | Anderson | |
| 2009/0118620 A1 | 5/2009 | Tgavalekos et al. | |
| 2010/0113917 A1 | 5/2010 | Anderson | |
| 2012/0105619 A1 | 5/2012 | PallikkaraGopalan et al. | |
| 2012/0203067 A1 | 8/2012 | Higgins et al. | |
| 2013/0113915 A1 | 5/2013 | Scheid et al. | |
| 2014/0098091 A1 | 4/2014 | Hori | |
| 2014/0207419 A1 | 7/2014 | Messinger et al. | |
| 2015/0022655 A1 | 1/2015 | Ruhge | |
| 2015/0172567 A1 | 6/2015 | Ekeroth | |
| 2015/0319410 A1 | 11/2015 | Gu et al. | |
| 2015/0341600 A1 | 11/2015 | Hatcher, Jr. et al. | |
| 2016/0025653 A1 | 1/2016 | Jalilian et al. | |
| 2016/0088204 A1 | 3/2016 | Liang et al. | |
| 2016/0178533 A1 | 6/2016 | Gladnick | |
| 2017/0122123 A1 | 5/2017 | Kell et al. | |
| 2017/0148309 A1 | 5/2017 | Messinger et al. | |
| 2017/0167285 A1 | 6/2017 | Diwinsky et al. | |
| 2017/0167289 A1 | 6/2017 | Diwinsky et al. | |
| 2017/0223273 A1 | 8/2017 | Bendall et al. | |
| 2019/0139206 A1 * | 5/2019 | Derakhshani | G06T 5/50 |

* cited by examiner

HIGH DYNAMIC RANGE VIDEO CAPTURE USING VARIABLE LIGHTING

FIELD

The present subject matter relates generally to a probe for inspection of a machine, and more particularly to a system and method for producing a high dynamic range video.

BACKGROUND

Optical scopes are used as an inspection tool to view inside an apparatus such as a turbomachine or engine. Optical scopes, such as borescopes, include a removable optical adapter tip at an end of the optical scope. The optical adapter is generally suited for various purposes, such as providing a discrete direction of view. The optical scope, including the optical adapter, is ingressed into the apparatus for viewing and assessing internal components.

In order to allow for periodic inspection of internal parts of the engine (e.g., blades, vanes, shrouds, disks, frames, etc.), borescope ports are typically provided in the engine casings and/or frames. Such ports allow optical borescope instruments to be inserted into the core engine to enable a visual inspection of the engine to be performed without requiring disassembly of the engine components. In an enclosed environment, such as inside a turbine engine, ambient light may be virtually eliminated. In such an environment, only artificial light provided by the borescope and associated lighting system may used to create an image.

Capturing details of the internal parts of the engine may be difficult due to the provided artificial light. For example, creating a clear borescope video of a turbine engine may be challenging due to the reflections from metal components and darker components of the engine. More specifically, reflections from metal components can create very bright parts of an image. On the other hand, other components within the engine may produce very dark parts of the image due to shadows, corrosion, or less reflective materials. Such contrasting bright and dark parts of an image may make it impossible to capture the details of both portions with a single image. For example, the bright parts of the image may be washed out, while the dark parts may be too dark to see. These issues may make perceiving defects or damage to engine components more difficult. The ratio of brightest to the darkest shades the system may capture simultaneously in a single image is generally known as the dynamic range.

Some inspection processes use methods such as high dynamic range (HDR) photography to capture images with both light and dark portions. In these methods, the camera exposure setting may be modulated with a constant light source. For example, multiple photos can be taken at different exposure levels and then combined with software to create an image with better contrast between the light and dark portions of the image. Such methods can create difficulties by requiring changes to the exposure and camera settings for every frame of video.

As such, there is a need for a method of capturing high dynamic range video using an optical scope without having to change camera settings, such as the exposure, between each frame.

BRIEF DESCRIPTION

Aspects and advantages of the invention will be set forth in part in the following description, or may be obvious from the description, or may be learned through practice of the invention.

In one aspect the present disclosure is directed to a method of producing a high dynamic range video using a probe including a camera and a light source. As such, the probe produces a plurality of frames. The method includes modulating the light source between a first lighting characteristic and a second lighting characteristic. More specifically, first lighting characteristic is different from the second lighting characteristic. Another step includes producing a first video at a first frame rate using the camera and the light source. Further, the first video defines a first frame at a first lighting characteristic, and a second frame at a second lighting characteristic. The method also includes generating a composite frame based on at least portions of the first frame and second frame. Each portion of the first frame and the second frame being at or above a first threshold of light, at or below a second threshold of light, or both. An additional step includes generating from a computer a second video that includes a plurality of composite frames with a high dynamic range at a second frame rate. More specifically, the second frame rate is lower than the first frame rate.

In another embodiment, the method may include filtering out, by use of the computer installed with video processing instructions, portions of the first frame and second frame captured under a first threshold of light and above a second threshold of light. In a further embodiment, the lighting characteristic may include any combination of frequency, intensity, or amplitude of light. In a still further embodiment, the second lighting characteristic may define at least one different frequency, intensity, or amplitude of light compared to the first lighting characteristic. In yet another embodiment, the method may include transmitting the first video to the computer including at least one processor and at least one memory device. Further, the memory device may contain video processing instructions.

In a further embodiment, the modulation of the light source may occur in an ordered sequence from the lowest amplitude of light to the highest amplitude of light, from the highest amplitude of light to the lowest amplitude of light, or both. In another embodiment, modulation of the light source may occur in a random sequence of the light amplitudes. In yet another embodiment, the composite frames may only contain portions captured between the first threshold of light and the second threshold of light. In a different embodiment, the first threshold of light may be approximately one candela per square meter ($cd/m^2$), and the second threshold of light may be approximately two million candelas per square meter ($cd/m^2$). In another embodiment, the method may include inserting the probe into an area with ambient light at or below approximately one lux. As such, in a different embodiment, the method may include inserting the probe into a turbomachine.

In another embodiment, the method may include detecting an undesirable characteristic on an exterior surface of an object, on an interior surface of the object, or both using the second video. Still further, the method may include displaying the second video on a display. In certain embodiments, the first frame rate may be at least one of approximately one hundred twenty frames per second or greater or approximately sixty frames per second or greater. Still in other embodiments, the second frame rate may be at least one of approximately twenty-four frames per second or less, approximately thirty frames per second or less, or approximately fifteen frames per second or less. In another embodiment, the first frame rate may be at least approximately one hundred twenty frames per second or greater, and the second frame rate may be at least approximately twenty-four frames per second or less.

In another aspect, the present disclosure is directed to system for producing a high dynamic range video. The system includes a probe and a computer. The probe includes a camera and a light source. Further, the probe produces a plurality of frames. The computer includes at least one processor and at least one memory device. Further, memory device contains instructions configured to combine the plurality of frames into composite frames. The instructions are further configured to filter out portions of frames captured below a first threshold of light and portions of frames captured above a second threshold of light. Further, the light source modulates at least one of a lighting characteristic. As such, the camera captures a first video with the modulated light source to produce a plurality of frames. More specifically, the plurality of frames defines a plurality of lighting characteristics. The computer combines the plurality of frames into a second video including a plurality of composite frames with a high dynamic range. In an additional embodiment, the light source may be a light emitting diode (LED). In another embodiment, the probe may be a borescope.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
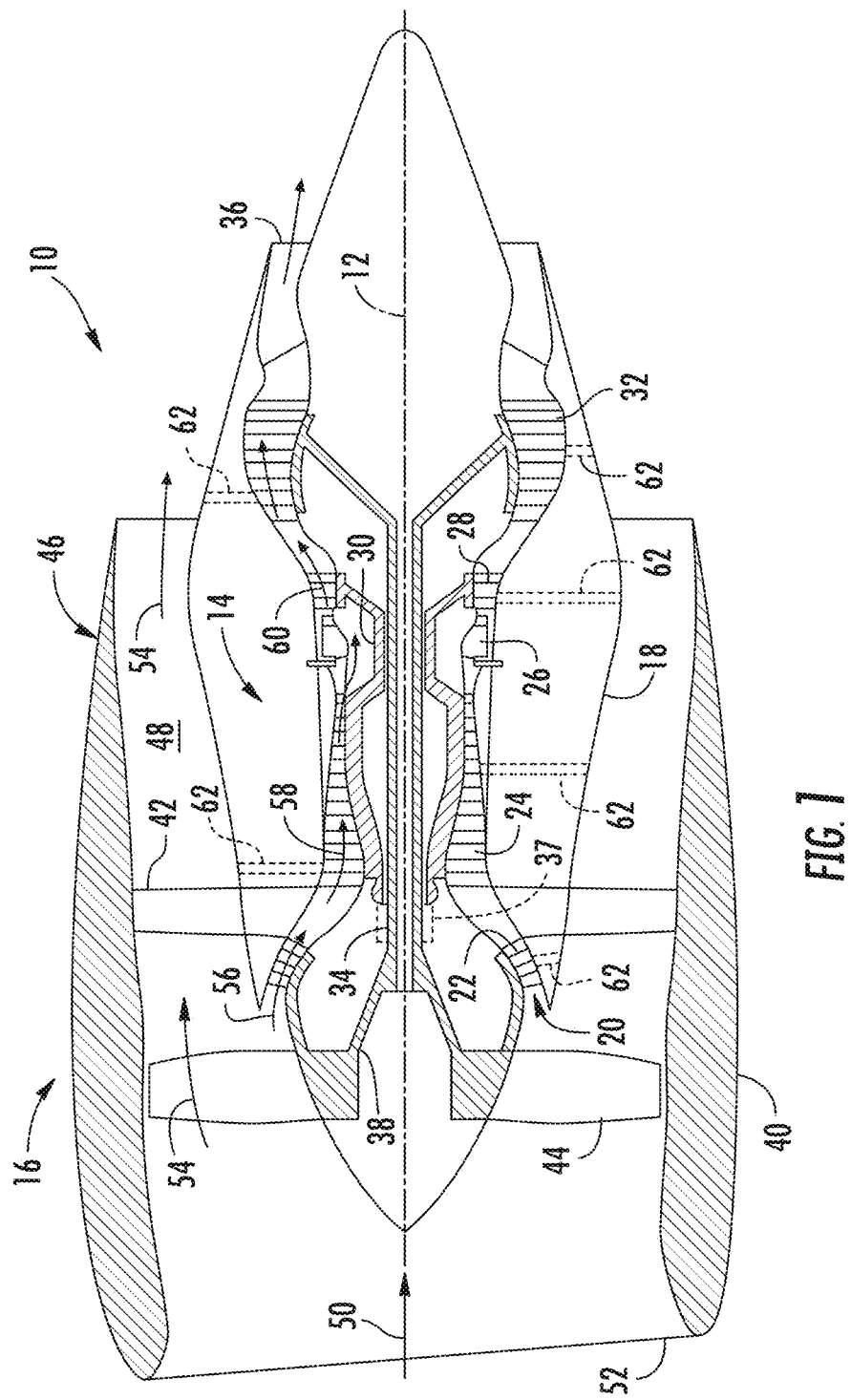
FIG. 1 illustrates a cross-sectional view of one embodiment of a gas turbine engine that may be utilized in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

A system and method is generally provided for producing a high dynamic range video. A high dynamic range video is generally any video capable of reproducing a greater dynamic range of luminosity than is possible with standard video techniques. For example, in one embodiment, the system includes a probe and a computer communicatively coupled to the probe. The probe includes a camera and a light source. More specifically, the camera may include a sensor such as an optical sensor. Further, the probe produces a plurality of frames. The computer includes at least one processor and at least one memory device. As such, the memory device contains instructions configured to combine the plurality of frames into composite frames. The instructions are further configured to filter out portions of frames captured below a first threshold of light and portions of frames captured above a second threshold of light. As such, the light source modulates a lighting characteristic, such as frequency, intensity, or amplitude of light. Further, the camera captures a first video with the modulated light source to produce a plurality of frames defining a plurality of lighting characteristics. Further, the computer combines the plurality of frames into a second video including a plurality of composite frames with a high dynamic range.

In certain embodiments, the system for producing a high dynamic range video can be used to capture areas that normally produce very bright parts of a frame and/or very dark parts of frame. Further, it is possible to capture the details of both the bright and dark portions of an object in a single image, video, or both. More specifically, the system can be used to produce a high dynamic range video with a full range of tones. The ability to capture a high dynamic range video while inspecting an engine can make it much easier to spot defects or damage to engine components, which could otherwise go unnoticed due to the very high contrast environment inside turbomachinery. Furthermore, the system may produce the high dynamic range video without requiring changing the settings, such as exposure, of the camera for every frame of video.

It should also be appreciated that the disclosed system and method may generally be used to produce video within any suitable type of turbine engine, including aircraft-based turbine engines, land-based turbine engines, gas turbine engines, or steam turbine engines, regardless of the engine's current assembly state (e.g., fully or partially assembled). Additionally, with reference to aircraft engines, it should be appreciated that the present subject matter may be used on wing or off wing. Furthermore, the disclosed system and method may be generally used to visually inspect any type of machine. More specifically, the system and method may generally be used on any machine with internal structure that is difficult to access or inspect or any location with low ambient lighting.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

The gas turbine engine 10 may also include a plurality of access ports defined through its casings and/or frames for providing access to the interior of the core engine 14. For instance, as shown in FIG. 1, the engine 10 may include a plurality of access ports 62 (only six of which are shown) defined through the outer casing 18 for providing internal access to one or both of the compressors 22, 24 and/or for providing internal access to one or both of the turbines 28, 32. In several embodiments, the access ports 62 may be spaced apart axially along the core engine 14. For instance, the access ports 62 may be spaced apart axially along each compressor 22, 24 and/or each turbine 28, 32 such that at least one access port 62 is located at each compressor stage and/or each turbine stage for providing access to the internal components located at such stage(s). In addition, the access ports 62 may also be spaced apart circumferentially around the core engine 14. For instance, a plurality of access ports 62 may be spaced apart circumferentially around each compressor stage and/or turbine stage.

It should be appreciated that, although the access ports 62 are generally described herein with reference to providing internal access to one or both of the compressors 22, 24 and/or for providing internal access to one or both of the turbines 28, 32, the gas turbine engine 10 may include access ports 62 providing access to any suitable internal location of the engine 10, such as by including access ports 62 that provide access within the combustor 26 and/or any other suitable component of the engine 10.

Figure 2:
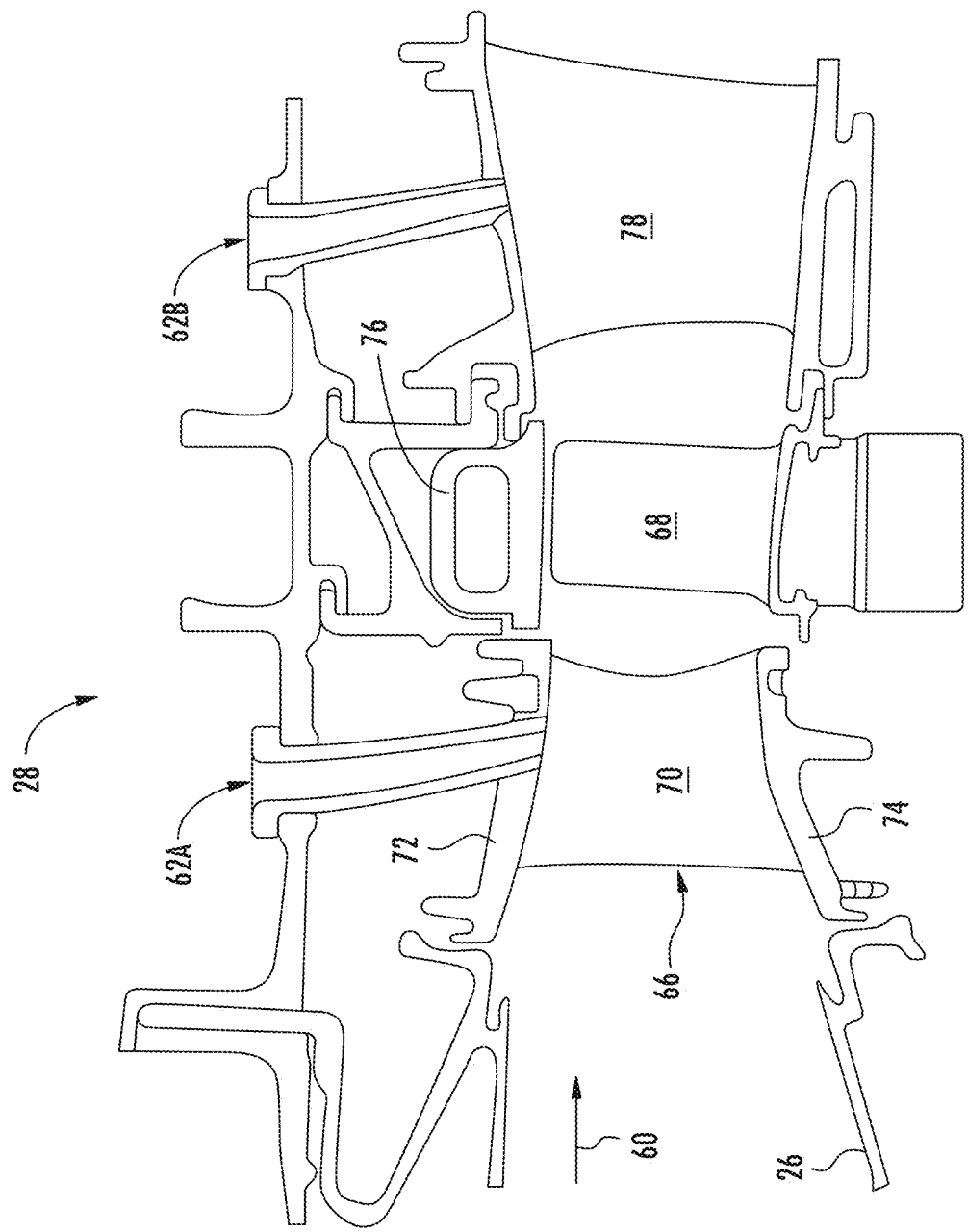
FIG. 2 illustrates a partial, cross-sectional view of a portion of the gas turbine engine shown in FIG. 1, particularly illustrating access ports defined in the engine for providing internal access.

Referring now to FIG. 2, a partial, cross-sectional view of the first (or high pressure) turbine 28 described above with reference to FIG. 1 is illustrated in accordance with embodiments of the present subject matter. As shown, the first turbine 28 may include a first stage turbine nozzle 66 and an annular array of rotating turbine blades 68 (one of which is shown) located immediately downstream of the nozzle 66. The nozzle 66 may generally be defined by an annular flow channel that includes a plurality of radially-extending, circularly-spaced nozzle vanes 70 (one of which is shown). The vanes 70 may be supported between a number of arcuate outer bands 72 and arcuate inner bands 74. Additionally, the circumferentially spaced turbine blades 68 may generally be configured to extend radially outwardly from a rotor disk (not shown) that rotates about the centerline axis 12 (FIG. 1) of the engine 10. Moreover, a turbine shroud 76 may be positioned immediately adjacent to the radially outer tips of the turbine blades 68 so as to define the outer radial flowpath boundary for the combustion products 60 flowing through the turbine 28 along the hot gas path of the engine 10.

As indicated above, the turbine 28 may generally include any number of turbine stages, with each stage including an annular array of nozzle vanes and follow-up turbine blades 68. For example, as shown in FIG. 2, an annular array of nozzle vanes 78 of a second stage of the turbine 28 may be located immediately downstream of the turbine blades 68 of the first stage of the turbine 28.

Moreover, as shown in FIG. 2, a plurality of access ports 62 may be defined through the turbine casing and/or frame, with each access port 62 being configured to provide access to the interior of the turbine 28 at a different axial location. Specifically, as indicated above, the access ports 62 may, in several embodiments, be spaced apart axially such that each access port 62 is aligned with or otherwise provides interior access to a different stage of the turbine 28. For instance, as shown in FIG. 2, a first access port 62A may be defined through the turbine casing/frame to provide access to the first stage of the turbine 28 while a second access port 62B may be defined through the turbine casing/frame to provide access to the second stage of the turbine 28.

It should be appreciated that similar access ports 62 may also be provided for any other stages of the turbine 28 and/or for any turbine stages of the second (or low pressure) turbine 32. It should also be appreciated that, in addition to the axially spaced access ports 62 shown in FIG. 2, access ports 62 may be also provided at differing circumferentially spaced locations. For instance, in one embodiment, a plurality of circumferentially spaced access ports may be defined through the turbine casing/frame at each turbine stage to provide interior access to the turbine 28 at multiple circumferential locations around the turbine stage.

Figure 3:
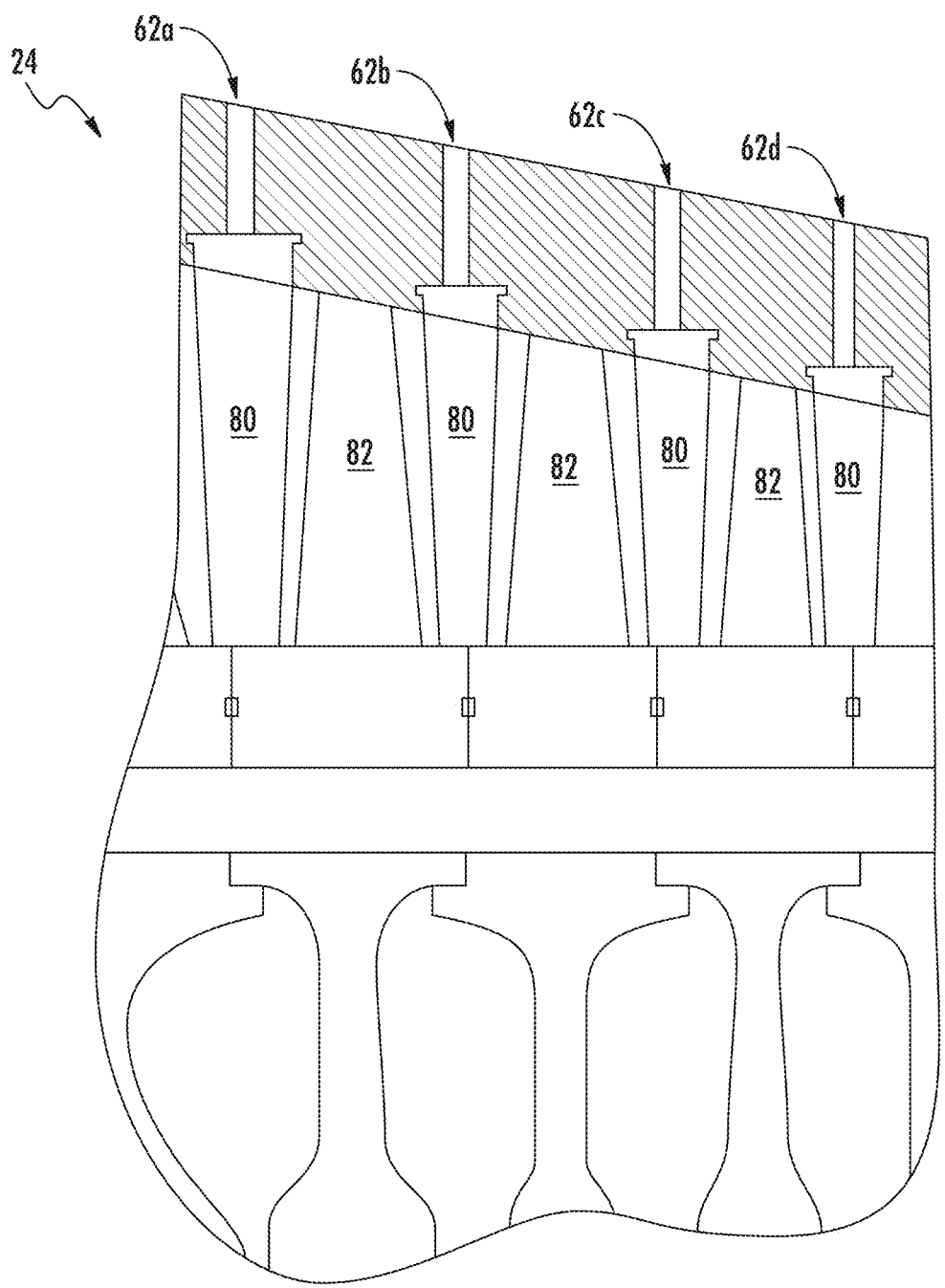
FIG. 3 illustrates a partial, cross-sectional view of one embodiment of a compressor suitable for use within the gas turbine engine shown in FIG. 1, particularly illustrating access ports defined in the engine for providing internal access to the compressor.

Referring now to FIG. 3, a partial, cross-sectional view of the high pressure compressor 24 described above with reference to FIG. 1 is illustrated in accordance with embodiments of the present subject matter. As shown, the compressor 24 may include a plurality of compressor stages, with each stage including both an annular array of fixed compressor vanes 80 (only one of which is shown for each stage) and an annular array of rotatable compressor blades 82 (only one of which is shown for each stage). Each row of compressor vanes 80 is generally configured to direct air flowing through the compressor 24 to the row of compressor blades 82 immediately downstream thereof.

Moreover, the compressor 24 may include a plurality of access ports 62 defined through the compressor casing/frame, with each access port 62 being configured to provide access to the interior of the compressor 24 at a different axial location. Specifically, in several embodiments, the access ports 62 may be spaced apart axially such that each access port 62 is aligned with or otherwise provides interior access to a different stage of the compressor 24. For instance, as shown in FIG. 3, first, second, third and fourth access ports 62a, 62b, 62c, 62d are illustrated that provide access to four successive stages, respectively, of the compressor 24.

It should be appreciated that similar access ports 62 may also be provided for any of the other stages of the compressor 24 and/or for any of the stages of the low pressure compressor 22. It should also be appreciated that, in addition to the axially spaced access ports 62 shown in FIG. 3, access ports 62 may be also provided at differing circumferentially spaced locations. For instance, in one embodiment, a plurality of circumferentially spaced access ports may be defined through the compressor casing/frame at each compressor stage to provide interior access to the compressor 24 at multiple circumferential locations around the compressor stage.

Figure 4:
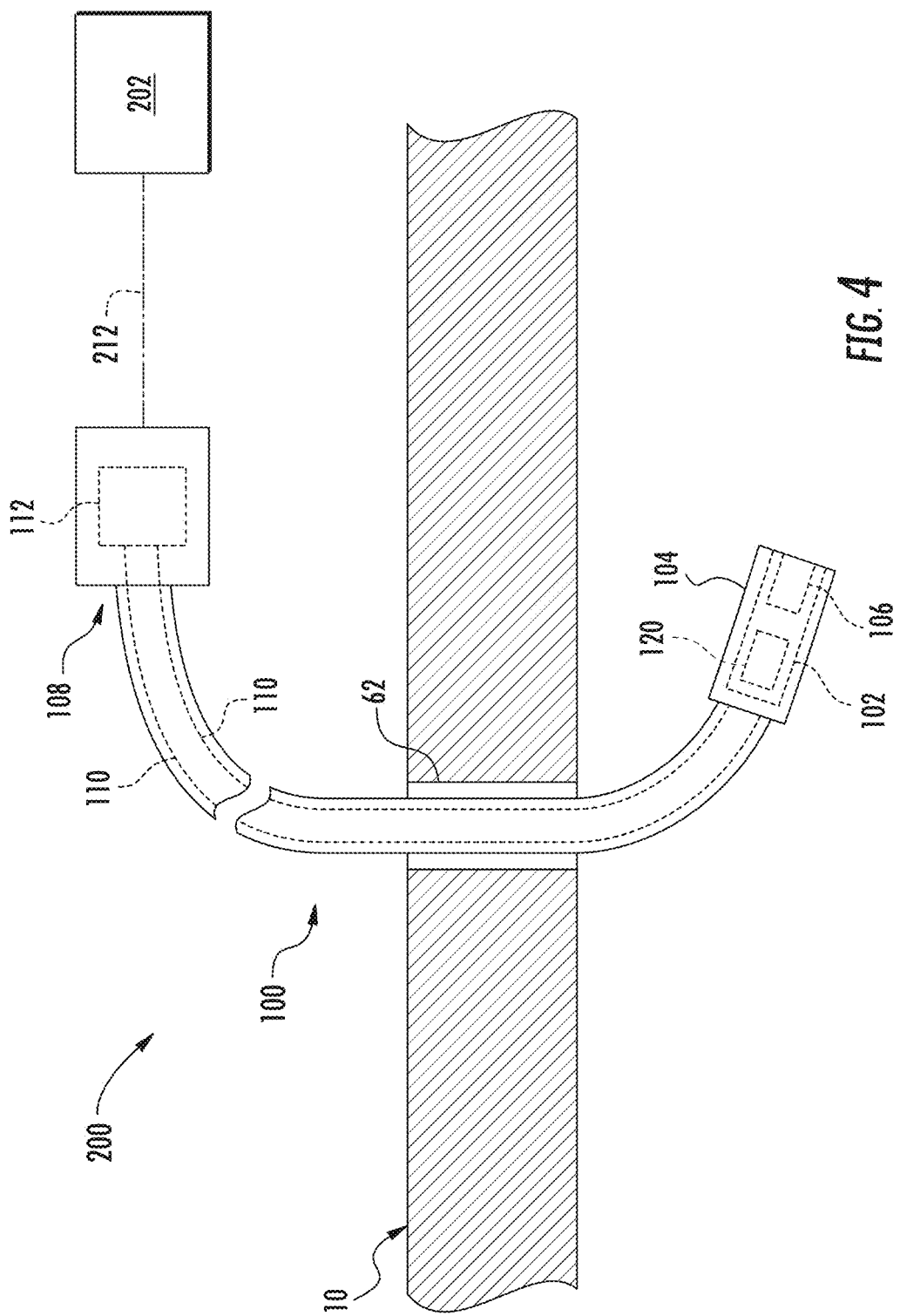
FIG. 4 illustrates a simplified view of one embodiment of a probe that may be used in accordance with aspects of the present subject matter to visually inspect a gas turbine engine and a system for producing a high dynamic range video.
Figure 5:
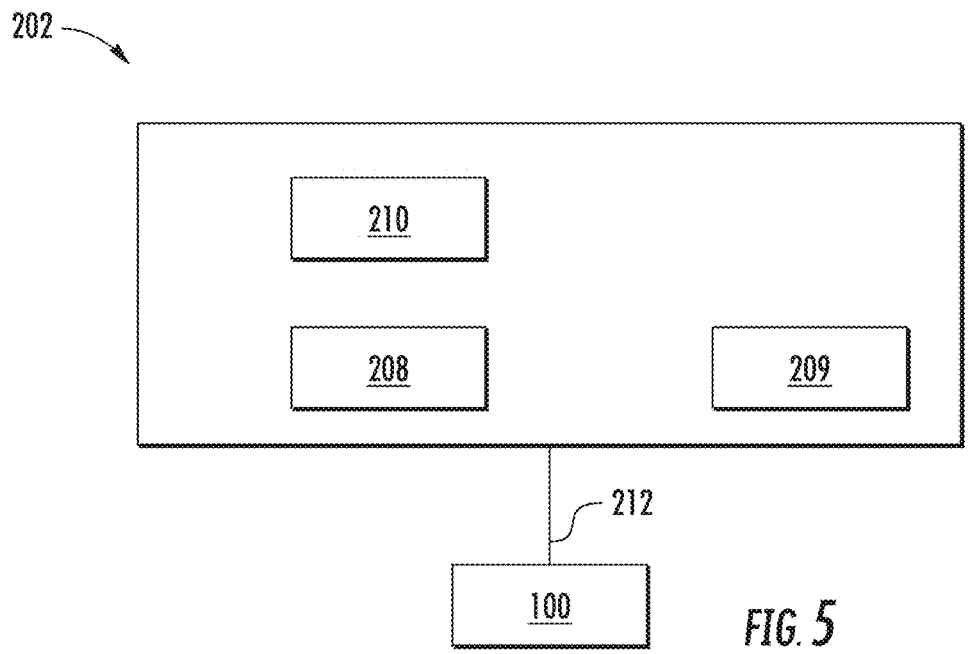
FIG. 5 illustrates one embodiment of a computer configured to produce a high dynamic range video in accordance with aspects of the present subject matter.
Figure 6:
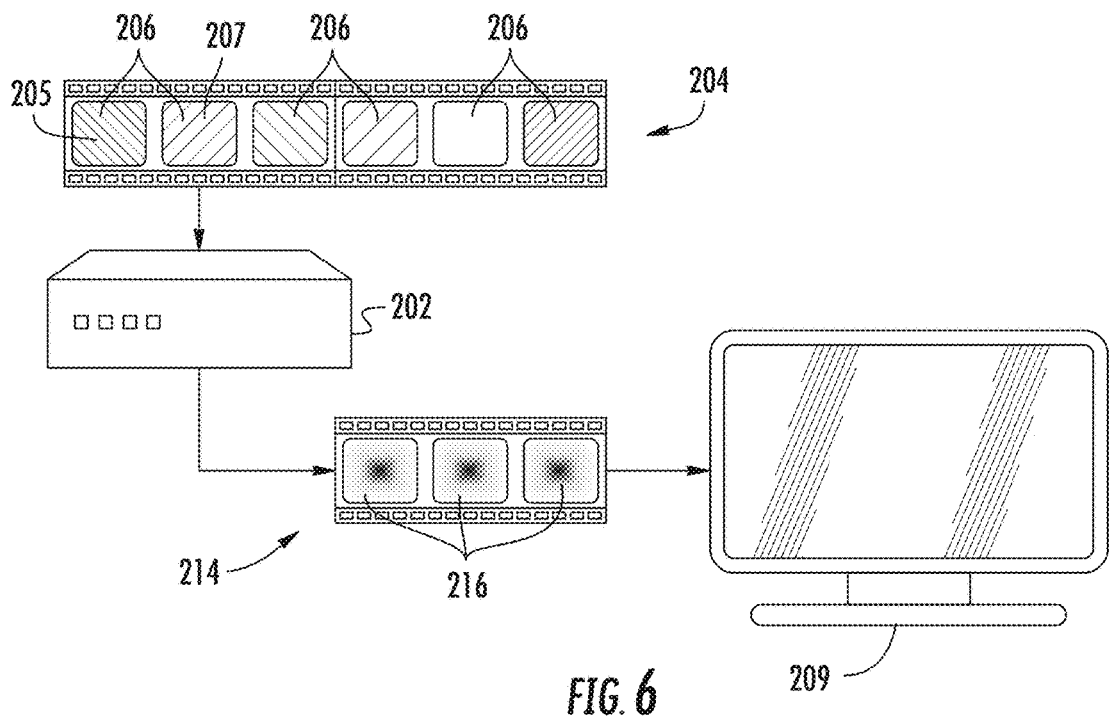
FIG. 6 illustrates another embodiment of the computer of FIG. 5 configured to produce a video with composite frames of a high dynamic range in accordance with aspects of the present subject matter.

Referring now generally to FIGS. 4-6, simplified views of one embodiment of a system 200 for producing a high dynamic range video are illustrated in accordance with aspects of the present subject matter. More specifically, FIG. 4 illustrates a probe that may be used to visually inspect a gas turbine engine and a system for producing a high dynamic range video. FIG. 5 illustrates one embodiment of a computer configured to produce a high dynamic range video. FIG. 6 illustrates another embodiment of the computer of FIG. 5 configured to produce a video with composite frames of a high dynamic range. As shown, the probe 100 has been inserted through an access port 62 of the engine 10, such as any of the access ports 62 described above with reference to FIGS. 1-3.

More specifically, as shown the system 200 includes the probe 100 and a computer 202 communicatively coupled to the probe 100. The probe 100 includes a camera and a light source 106. More specifically, the camera may include a sensor 120 such as an optical sensor. Further, the probe 100 produces a plurality of frames 206. The computer 202 includes at least one processor 208 and at least one memory device 210. As such, the memory device 210 contains instructions configured to combine the plurality of frames 206 into composite frames 216. The instructions are further configured to filter out portions of frames captured below a first threshold of light and portions of frames captured above a second threshold of light. The light source 106 modulates at least one of a lighting characteristic. The lighting characteristic may include at least one of a frequency, intensity, or amplitude of light. As such, the camera captures a first video with the modulated light source 106 to produce a plurality of frames 206 defining a plurality of lighting characteristics. Further, the computer 202 combines the plurality of frames 206 into a second video including a plurality of composite frames 216 with a high dynamic range.

Referring particularly to FIG. 4, in general, the probe 100 may correspond to any suitable probe configured to be inserted within the gas turbine engine 10 via an access port 62. Specifically, as shown in the illustrated embodiment, the probe 100 corresponds to an optical probe. In such an embodiment, the optical probe may correspond to any suitable optical device that may be inserted through an access port 62 of the gas turbine engine 10 to allow images of the interior of the engine 10 to be captured or otherwise obtained. For instance, in several embodiments, the optical probe may correspond to a borescope, videoscope, fiberscope, or any other similar optical device known in the art that allows for the interior of a gas turbine engine 10 to be viewed through an access port 62.

In such embodiments, a sensor housing 102 may include one or more optical elements, such as one or more optical lenses, optical fibers, image capture devices (e.g., video cameras, still-image cameras, CCD devices, CMOS devices), cables, and/or the like, for obtaining views or images of the interior of the engine 10 at a tip 104 of the probe 100 and for transmitting or relaying such images from the probe tip 104 along the length of the probe 100 to the exterior of the engine 10. As such, the sensor housing 102 may include a sensor 120 (e.g. an optical sensor) that acts as a camera. For instance, as shown in FIG. 4, the interior views or images obtained by the probe 100 may be transmitted from the probe tip 104 to a computer 202 connected or otherwise coupled to the probe 100 via communicative cable 212. Additionally, as shown in FIG. 4, a light source 106, such as an LED, may be provided at or adjacent to the probe tip 104 to provide lighting within the interior of the engine 10.

Still referring to FIG. 4, the probe 100 produces a plurality of frames 206 (as seen in FIG. 6) via the sensor 120 acting as a camera. The sensor 120 produces the plurality of frames 206 at a first frame rate. In some embodiments, the first frame rate may include at least one of approximately one hundred (120) frames per second or approximately sixty (60) frames per second. The light source 106 is configured to modulate a lighting characteristic. More specifically, the lighting characteristic may include at least one of a frequency, intensity, amplitude, or all of the preceding. In certain embodiments, the light source may modulate between a first lighting characteristic and a second lighting characteristic. More specifically, the first lighting characteristic is different from the second lighting characteristic. In certain embodiments, the first lighting characteristic may be a first amplitude of light, and the second lighting characteristic may be a second amplitude of light. In the present embodiment, the first amplitude of light may be bright, whereas the second amplitude of light may be dim. The dim amplitude of light can be chosen in order to allow the sensor 120 to accurately and clearly capture components of the engine 10 that are reflective. Similarly, the bright amplitude of light can be chosen in order to allow the sensor 120 to accurately and clearly capture components of the engine 10 that are less reflective due to shadows, corrosion, and/or manufacture from materials that do not as readily reflect light.

More specifically, in certain situations only the bright amplitude of light may be able to accurately and clearly capture dim components of the engine 10, and only the dim amplitude of light may be able to accurately and clearly capture reflective portions of the engine 10. For example, reflective surfaces may be washed out in frames 206 captured using the bright amplitude of light. On the other hand, less reflective surfaces may be too dark to make out in frames 206 captured using the dim amplitude of light. As such, both the frames captured using the dim amplitude of light and frames captured using the bright amplitude of light may be necessary to clearly show all the internal surfaces of the engine 10.

In certain embodiments, the light source may modulate between discrete lighting characteristics. In other embodiments, the light source 106 may be configured to modulate between at least five discrete lighting characteristics. More specifically, each discrete lighting characteristic is different from the others. For example, the light source 106 may modulate between discrete amplitudes of light. As such, the use of a plurality of amplitudes of light may allow for the accurate and clear capture of surfaces of the engine 10 with varied degrees of reflectiveness. The modulation of the amplitude of light may occur in an ordered sequence from the lowest amplitude of light to the highest amplitude of light. For instance the light may modulate starting from the lowest amplitude of light, proceed to the next highest amplitude of light, and so on until the highest amplitude of light is reached. Further, the light may then modulate in a reverse order from the highest amplitude of light to the lowest amplitude of light or may repeat the modulation from the lowest amplitude of light to the highest amplitude of light. In other embodiments, the modulation of the light source 106 can occur in any pattern. For example, the amplitudes of light may be modulated in a random sequence. More specifically, the computer 202 may send signals to modulate the lighting characteristics of the light source 106 in a seemingly random order. For instance, random number generators are known that may create what appears to be random sampling of outputs.

In embodiments of the system 200 as disclosed herein, the modulation of the amplitude of the light source must be synchronized in order to achieve frames 206 at each discrete light amplitude. More specifically, the modulation of the light source 106 is timed so that the sensor 120 captures a first frame 205 at the first amplitude of light and a second frame 207 at the second level of light. In embodiments where the light source 106 is configured to output more than two amplitudes of light, the synchronization of the modulation occurs such that each frame 206 captures a discrete amplitude of light. As such, the light source 106 may be of a type that is capable of modulation at a high frequency. In the embodiments illustrated, the light source 106 may be a LED. Specifically, LEDs are known that may turn on/off, change intensity, or both in microseconds. The sensor 120 is configured to produce a first video 204 at the first frame rate. For example, the sensor 120 may be configured to produce a video at one hundred twenty (120) frames per second. As such, the light source 106 is configured to modulate the light at one hundred twenty (120) hertz. More specifically, the modulation of the light source 106 is synchronized such that each frame 206 is captured while the light source 106 outputs light at each discrete amplitude.

Still referring to FIG. 4, the system 200 may include communicative cable 212 used to transfer signals between the probe 100 to the computer 202. For instance, the first video 204 is transferred from the sensor 120 through the probe 100 via the cable and to the computer 202 using the communicative cable 212. Further, the computer 202 may be configured to send signals to the probe 100 to implement the first frame rate of the first video 204 and/or to modulate the light source 106. More specifically, the computer 202 can be configured to properly synchronize the modulation of the light source 106 and the first frame rate such that each frame 206 is captured at one of the discrete amplitudes of light.

The optical probe 100 may also include an articulation assembly 108 that allows the orientation of the probe tip 104 to be adjusted within the interior of the gas turbine engine 10. For example, the articulation assembly 108 may allow for the probe tip 104 to be rotated or pivoted about a single axis or multiples axes to adjust the orientation of the tip 104 relative to the remainder of the probe 100. It should be appreciated that the articulation assembly 108 may generally have any suitable configuration and/or may include any suitable components that allow for adjustment of the orientation of the probe tip 104 relative to the remainder of the probe 100. For example, in one embodiment, a plurality of articulation cables 110 may be coupled between the probe tip 104 and one or more articulation motors 112. In such an embodiment, by adjusting the tension of the cables 110 via the motor(s) 112, the probe tip 104 may be reoriented within the gas turbine engine 10.

It should also be appreciated that, in several embodiments, the articulation assembly 108 may be configured to be electronically controlled. Specifically, as shown in FIG. 4, the computer 202 may be communicatively coupled to the articulation assembly 108 via communicative cable 212 to allow the computer 202 to adjust the orientation of the probe tip 104 via control of the articulation assembly 108. For instance, in the illustrated embodiment, the computer 202 may be configured to transmit suitable control signals to the articulation motor(s) 112 in order to adjust the tension within the associated cable(s) 110, thereby allowing the computer 202 to automatically adjust the orientation of the probe tip 104 within the gas turbine engine 10.

It should be appreciated that, in other embodiments, the probe 100 may correspond to any other suitable probe configured to capture video within the turbine engine 10 via one of its access ports 62. For instance, in an alternative embodiment, the probe 100 may correspond to a repair probe configured to be inserted within the gas turbine engine 10 to allow a repair procedure to be performed on one or more of the internal engine components, such as a probe used to repair cracks and/or other damage within the engine.

Referring now to FIG. 5, a block diagram of the computer 202 according to the present disclosure is illustrated. In general, the computer 202 may correspond to any suitable processor-based device and/or any suitable combination of processor-based devices. Thus, in several embodiments, the computing 202 may include one or more processor(s) 208 and associated memory device(s) 210 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and/or other programmable circuits.

Additionally, the memory device(s) 210 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory device(s) 210 may generally be configured to store suitable computer-readable instructions that, when implemented by the processor(s) 208, configure the computer 202 to perform various functions including, but not limited to, sending signals to sensor 120 to control the first frame rate of the first video 204, sending signals to the light source 106 to control the modulation of the light source, sending signals to the probe 100 to properly synchronize the modulation of the light source 106 and the first frame rate of the sensor 120 so that each frame 206 is captured at a different amplitude level, receiving the first video 204 from the probe 100 and modifying the video to form a second video 214 (as seen in FIG. 6), and/or sending signals to the articulation assembly 108 to adjust the orientation of the probe tip 104.

Referring now to FIG. 6, a simplified view of the computer 202 of FIG. 5 installed with video processing instructions is illustrated in accordance with aspects of the present subject matter. More specifically, the memory 210 may be installed with video processing instructions (e.g. software or firmware) that may be implemented by the processor 208. As such, the probe 100 transmits to the computer 202 a first video 204 filmed at a first frame rate. The first video 204 includes a plurality of frames 206 captured by the sensor 120 while the light source 106 was modulated between different light amplitudes. More specifically, the frames 206 can be frames captured at a first amplitude of light or a second amplitude of light. In some embodiments, such as the embodiment illustrated in FIG. 6, the plurality of frames 206 includes frames 206 captured at five or more discrete amplitudes of light from bright to dim.

The video processing instructions are configured to recognize portions of the frames 206 captured under a first threshold of light. More specifically, the video processing instructions may recognize portions of frames 206 in which the light amplitude provided by the light source 106 was too dim to accurately and/or clearly represent details of the filmed object. Similarly, the video processing instructions are configured to recognize portions of frames 206 captured over a second threshold of light. More specifically the video processing instructions may recognize portions of frames 206 in which the light amplitude provided by the light source 106 was too bright to accurately and/or clearly represent details of the filmed object. Further, the video processing instructions are configured to filter out portions of frames 206 captured under the first threshold of light and portions of frames 206 captured above the second threshold of light. In one embodiment, the first threshold of light may be approximately one (1) candela per square meter ($cd/m^2$), and the second threshold of light may be approximately two million (2,000,000) candelas per square meter ($cd/m^2$).

Further, the computer 202 is configured to combine the plurality of frames 206 using the video processing instructions to produce a plurality of composite frames 216. As such, the composite frames 216 essentially only contain portions of the frames 206 captured between the first threshold of light and the second threshold of light. More specifically, the filtering of the frames 206 may produce composite frames 216 where highly illuminated reflective surfaces have been eliminated. For example, the portions of the frames 206 that were washed out in the original frames 206 may have been removed. Similarly, the filtering of the frames 206 may produce composite frames 216 where dimly illuminated surfaces that are less reflective have been eliminated. For example, portions of the frames 206 that were too dark to properly show details of the filmed object may have been removed. As such, the plurality of composite frames 216 may clearly and accurately show both surfaces that were too dark, too bright, or both in the original frames 206 to make out details.

Still referring to FIG. 6, the computer 202, via the video processing instructions, generates a second video 214 at a second frame rate. The second video 214 includes the composite frames 216. As such, the second video 214 necessarily has a lower frame rate than the first video 204 with the first frame rate. In some embodiments, the second frame rate may include at least one of approximately thirty (30) frames per second, approximately twenty-four (24) frames per second, and/or approximately fifteen (15) frames per second. In one embodiment, the first frame rate may be approximately one hundred twenty (120) frames per second, and the second frame rate may be approximately twenty-four (24) frames per second. Further, the composite frames 216 of the second video 214 may only contain portions of the frames 206 captured between the first and second thresholds of light. For example, the second video 214 may accurately show both the highly reflective surfaces of the object and the less reflective surfaces of the object in a single video. As such, the second video 214 may be a high dynamic range video. In some embodiments, the second video 214 may be displayed on a display 209, as also seen in FIG. 5.

Figure 7:
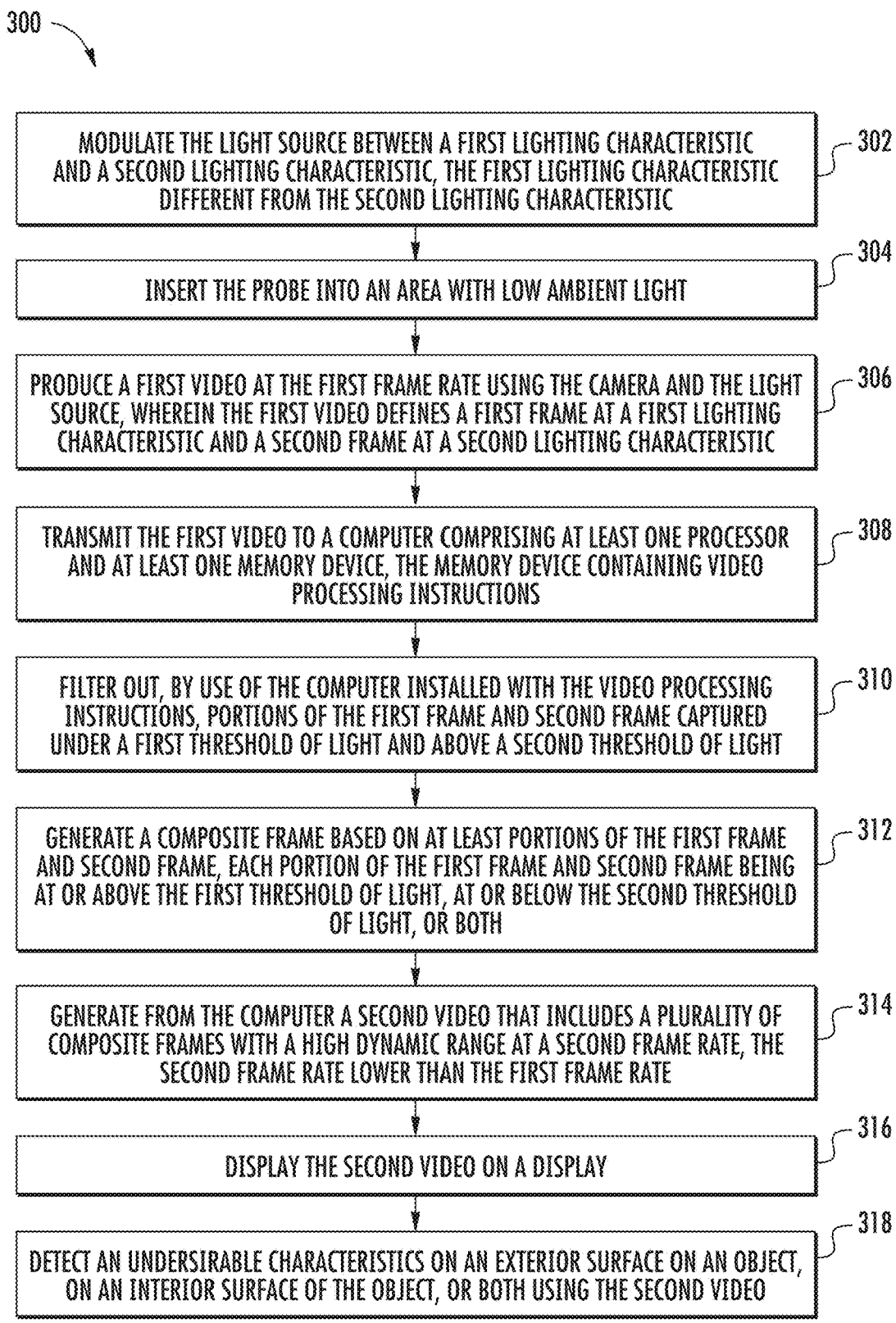
FIG. 7 illustrates a flow diagram of a method for producing a video with a high dynamic range according to aspects of the present subject matter.

Referring now to FIG. 7, a flow diagram of one embodiment of a method 300 for producing a high dynamic range video is illustrated in accordance with aspects of the present disclosure. The method may be used generally with the system described in FIGS. 4-6 or with any other capable system. The method 300 uses a probe 100 including a camera and a light source 106. In certain embodiments, the camera may be a sensor 120, such as an optical sensor. The probe produces a plurality of frames 206.

At step 302, the method 300 includes modulating the light source 106 between a first lighting characteristic and a second lighting characteristic. As such, the first lighting characteristic is different from the second lighting characteristic. More specifically, the lighting characteristic can be any combination of frequency, intensity, or amplitude of light. As such, the second lighting characteristic defines at least one different frequency, intensity, or amplitude of light compared to the first lighting characteristic. In some embodiments, the first lighting characteristic may be a first amplitude of light, and the second lighting characteristic may be a second amplitude of light. In further embodiments, the light source 106 may be configured to modulate between at least five discrete lighting characteristics, such as five discrete amplitudes of light. Wherein, each lighting characteristic is different from the others. It should be recognized that the modulation of the light source 106 may occur in any sequence. For example, where the modulated lighting characteristic is the amplitude of light, the light source 106 may modulate in an ordered sequence from the lowest amplitude level to the highest amplitude level, from the highest amplitude of light to the lowest amplitude of light, or both. The light source may also modulate in a random sequence of light amplitudes.

Another step 304 includes inserting the probe 100 into an area with low ambient light. In one embodiment, the area with low ambient lighting may include an area with approximately one (1) lux or less of ambient light. More specifically, in certain embodiments, the area with low ambient light may be the interior of a turbomachine.

Another step 306 includes producing a first video 204 at the first frame rate using the camera and the light source 106. The first video 204 defines a first frame 205 at a first lighting characteristic and a second frame 207 at a second lighting characteristic. The method 300 may include synchronizing the modulation of the light source 106 so that the camera captures a first frame 205 at the first lighting characteristic and a second frame 207 at the second lighting characteristic (as shown in FIG. 6). In embodiments where the light source 106 is configured to produce more than two lighting characteristics, the modulation may be synchronized such that each frame 206 captures a discrete lighting characteristic.

Still referring to FIG. 7, the method 300 also includes, at 308, transmitting the first video 204 to a computer 202 including at least one processor 208 and at least one memory device 210. Specifically, the memory device 210 contains video processing instructions. An additional step 310 may include filtering out, by use of the computer installed with the video processing instructions, portions of the first frame 205 and second frame 207 captured under a first threshold of light and above a second threshold of light. The method 300 includes at 312 generating a composite frame 216 based on at least portions of the first frame 205 and second frame 207. Wherein each portion of the first frame and second frame is at or above the first threshold of light, at or below the second threshold of light, or both. As such, the composite frames 216 may essentially only contain portions of the frames 206 captured between the first threshold of light and the second threshold of light. At step 314, the method 300 includes generating from the computer 202 a second video 214 that includes a plurality of composite frames 216 with a high dynamic range at a second frame rate. Specifically, the second frame rate is inherently lower than the first frame rate.

A further step 316 includes displaying the second video 214 on a display 209. Another step 318 includes detecting an undesirable characteristic on an exterior surface of an object, on an interior surface of an object, or both using the second video 214. For example, the method 300 can be used to detect internal or external damage or defects in a gas turbine engine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of producing a high dynamic range video using a probe comprising a camera and a light source, wherein the probe produces a plurality of frames, the method comprising:

repeatedly modulating the light source through a sequence of discrete lighting characteristics, wherein the sequence of discrete lighting characteristics repeats at a predetermined frequency;
synchronizing a sensor frame rate with the frequency of the modulation of the discrete lighting characteristics, wherein each frame is captured at a corresponding discrete lighting characteristic of the sequence;
producing a first video at the sensor frame rate, wherein the first video has a first frame rate, wherein the first video comprises a repeated sequence of frames corresponding to the repeated sequence of discrete lighting characteristics;
establishing a lower illumination threshold value;
establishing an upper illumination threshold value;
filtering, by use of the computer installed with video processing instructions, the sequences of frames of the first video so as to remove frame portions having an illumination value less than the lower illumination threshold value;
filtering, by use of the computer installed with video processing instructions, the sequences of frames of the first video so as to remove frame portions having an illumination value greater than the upper illumination threshold value;
generating a composite frame for each sequence of frames corresponding to the repeated sequence of discrete lighting characteristics, wherein the composite frame contains frame portions having only illumination values between the lower and upper illumination threshold values; and
generating from a computer a second video that includes a plurality of the composite frames with a high dynamic range at a second frame rate, the second frame rate lower than the first frame rate.

2. The method of claim 1, wherein the lighting characteristic comprises any combination of frequency, intensity, or amplitude of light.

3. The method of claim 1, wherein each discrete lighting characteristic defines at least one different frequency, intensity value, or an amplitude value.

4. The method of claim 1, further comprising:
transmitting the first video to the computer comprising at least one processor and at least one memory device, the memory device containing the video processing instructions.

5. The method of claim 1, wherein the modulation of the light source through the sequence of discrete lighting characteristics occurs in an ordered sequence from a lowest amplitude of light to a highest amplitude of light, from the highest amplitude of light to the lowest amplitude of light, or both.

6. The method of claim 1, wherein the modulation of the light source through the sequence of discrete lighting characteristics occurs in a random sequence of the light amplitudes.

7. The method of claim 1, wherein the lower illumination threshold value is one candela per square meter ($cd/m^2$) and the upper illumination threshold value is two million candelas per square meter ($cd/m^2$).

8. The method of claim 1, further comprising inserting the probe into an area with ambient light at or below one lux.

9. The method of claim 1, further comprising inserting the probe into a turbomachine.

10. The method of claim 1, further comprising detecting an undesirable characteristic on an exterior surface of an object, on an interior surface of the object, or both using the second video.

11. The method of claim 1, further comprising displaying the second video on a display.

12. The method of claim 1, wherein the first frame rate is at least one of one hundred twenty frames per second or greater or sixty frames per second.

13. The method of claim 1, wherein the second frame rate is thirty frames per second or less.

14. The method of claim 1, wherein the first frame rate is one hundred twenty frames per second or greater, and the second frame rate is twenty-four frames per second or less.

15. A system for producing a high dynamic range video, the system comprising:
- a probe comprising a camera and a light source, wherein the probe produces a first video comprising a repeated sequence of frames; and
- a computer comprising at least one processor and at least one memory device, the memory device containing instructions configured to combine each sequence of frames into a composite frame and combine the resultant composite frames into a second video with a high dynamic range, the instructions being further configured to filter out portions of frames having an illumination value less than a lower illumination threshold value and portions of frames having an illumination value greater than an upper illumination threshold value,
- wherein the light source repeatedly modulates through a sequence of discrete lighting characteristics, wherein the sequence of discrete lighting characteristics repeats at a predetermined frequency, wherein the predetermined frequency corresponds to a frame rate of the first video so that the sequence of discrete lighting characteristics corresponds to the sequence of frames, and wherein each frame is captured at a corresponding discrete lighting characteristic of the sequence.

16. The system of claim 15, wherein the light source comprises a light emitting diode (LED).

17. The system of claim 15, wherein the probe comprises a borescope.

18. The system of claim 15, wherein the lighting characteristic comprises any combination of frequency, intensity, or amplitude of light.

* * * * *